United States Patent
Sato (10) Patent No.: US 8,310,445 B2
(45) Date of Patent: Nov. 13, 2012

(54) REMOTE-CONTROL SYSTEM, REMOTE-CONTROL APPARATUS, APPARATUS TO BE CONTROLLED, REMOTE-CONTROL METHOD, COMPUTER PROGRAM, AND STORAGE MEDIUM

(75) Inventor: Noriaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1547 days.

(21) Appl. No.: 11/281,095

(22) Filed: Nov. 17, 2005

(65) Prior Publication Data

US 2006/0103508 A1 May 18, 2006

(30) Foreign Application Priority Data

Nov. 18, 2004 (JP) .................................. 2004-335004
Jul. 25, 2005 (JP) .................................. 2005-214330

(51) Int. Cl.
*G06F 3/033* (2006.01)
(52) U.S. Cl. ........ 345/157; 345/156; 345/159; 715/740; 715/856; 709/217
(58) Field of Classification Search ............ 345/21, 345/156, 157, 163; 715/740, 746, 753, 856; 709/208, 217, 227, 204
See application file for complete search history.

(56) References Cited

U.S. PATENT DOCUMENTS

| | | | | |
|---|---|---|---|---|
| 5,898,419 A * | 4/1999 | Liu | ................................ | 345/660 |
| 6,538,675 B2 * | 3/2003 | Aratani et al. | ................ | 715/856 |
| 7,114,018 B1 * | 9/2006 | Maity et al. | ..................... | 710/72 |
| 2005/0104852 A1 * | 5/2005 | Emerson et al. | .............. | 345/157 |
| 2006/0069797 A1 * | 3/2006 | Abdo et al. | .................... | 709/231 |
| 2007/0063972 A1 * | 3/2007 | Kawamura et al. | ........... | 345/156 |

FOREIGN PATENT DOCUMENTS

| | | | |
|---|---|---|---|
| JP | 5-165597 A | | 7/1993 |
| JP | 6-259219 A | | 9/1994 |
| JP | 6-332649 A | | 12/1994 |

* cited by examiner

*Primary Examiner* — Amare Mengistu
*Assistant Examiner* — Koosha Sharifi-Tafreshi
(74) *Attorney, Agent, or Firm* — Canon USA Inc. IP Division (57) ABSTRACT

A remote-control system including a remote-control apparatus and an apparatus to be controlled that are connected to each other via a network has an input unit configured to transmit a control event used for controlling the apparatus to be controlled by the remote-control apparatus, a generation unit configured to generate a first control amount of a coordinate space displayed by the apparatus to be controlled based on a second control amount of the control event transmitted from the input unit, and a control unit configured to control the apparatus to be controlled based on the first control amount.

3 Claims, 9 Drawing Sheets

REMOTE-CONTROL SYSTEM, REMOTE-CONTROL APPARATUS, APPARATUS TO BE CONTROLLED, REMOTE-CONTROL METHOD, COMPUTER PROGRAM, AND STORAGE MEDIUM

BACKGROUND OF THE INVENTION

1. Field of the Invention

The present invention relates to a technology adapted to remotely control an information-processing apparatus.

2. Description of the Related Art

Technologies relating to remote-control systems adapted to remotely control an information-processing apparatus via a network have been available. For example, technology relating to an electronic-conference system has been available. The electronic-conference system is formed, as a system including an information-processing apparatus that is to be remotely controlled (hereinafter referred to as "an apparatus to be controlled") and at least two information-processing apparatuses controlled by conferees, that is, users (hereinafter referred to as "remote-control apparatuses") that are connected to one another via a network. The electronic-conference system allows showing an output screen produced by the apparatus to be controlled on a predetermined output apparatus, that is, a display including a large display, a projector, and so forth so that the users can join the conference and share information offered by the output apparatus by remotely control the apparatus to be controlled.

The remote-control systems including the above-described electronic-conference system may be, for example, NetMeeting offered by Microsoft Corporation, Virtual Network Computing (VNC) and Desktop On-Call that are offered by International Business Machines Corporation (IBM), and pcAnywhere offered by Symantec Corporation.

Figure 6:
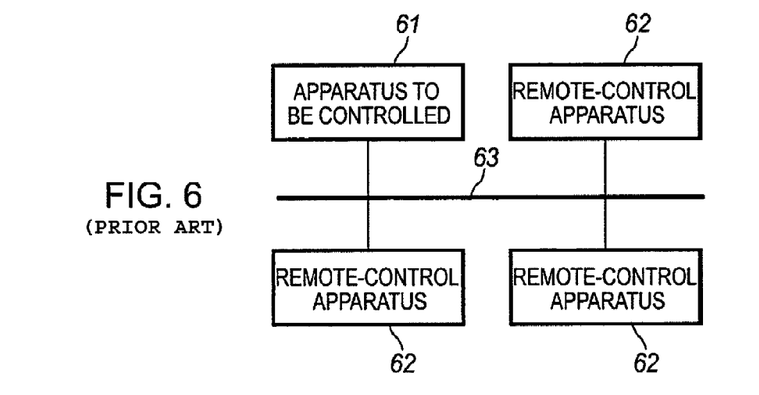
FIG. 6 is a block diagram illustrating an exemplary configuration of an electronic-conference system.

FIG. 6 is a block diagram illustrating the configuration of an example electronic-conference system. In FIG. 6, an apparatus to be controlled 61 is provided. An image of the details of data transmitted from the apparatus to be controlled 61 is produced on an output apparatus including a large display, a projector, and so forth. A plurality of remote-control apparatuses 62 are provided and connected to the apparatus to be controlled 61 via a communication network 63. A user remotely controls the apparatus to be controlled 61 by operating the remote-control apparatus 62.

In the remote-control systems including the above-described electronic-conference system, the resolution of a common screen produced by the output apparatus is not necessarily equivalent to that of a screen that is produced by the remote-control apparatus 62 and used for controlling the apparatus to be controlled 61 (hereinafter referred to as a "remote-control screen"). Therefore, the known remote-control systems linearly transform the coordinates shown on the remote-control screen produced by the remote-control apparatus 62 and remotely control the apparatus to be controlled 61 based on the transformed coordinates. The above-described linear transformation includes enlargement and/or reduction transformation, and translation transformation.

Remote control performed by using the linear transformation with the enlargement and/or reduction transformation, and the translation transformation is briefly described with reference to FIG. 8 which schematically shows the relationship between a display screen produced on a display unit such as a display and an output apparatus of the known remote-control apparatus 62, and that of the apparatus to be controlled 61.

Figure 8:
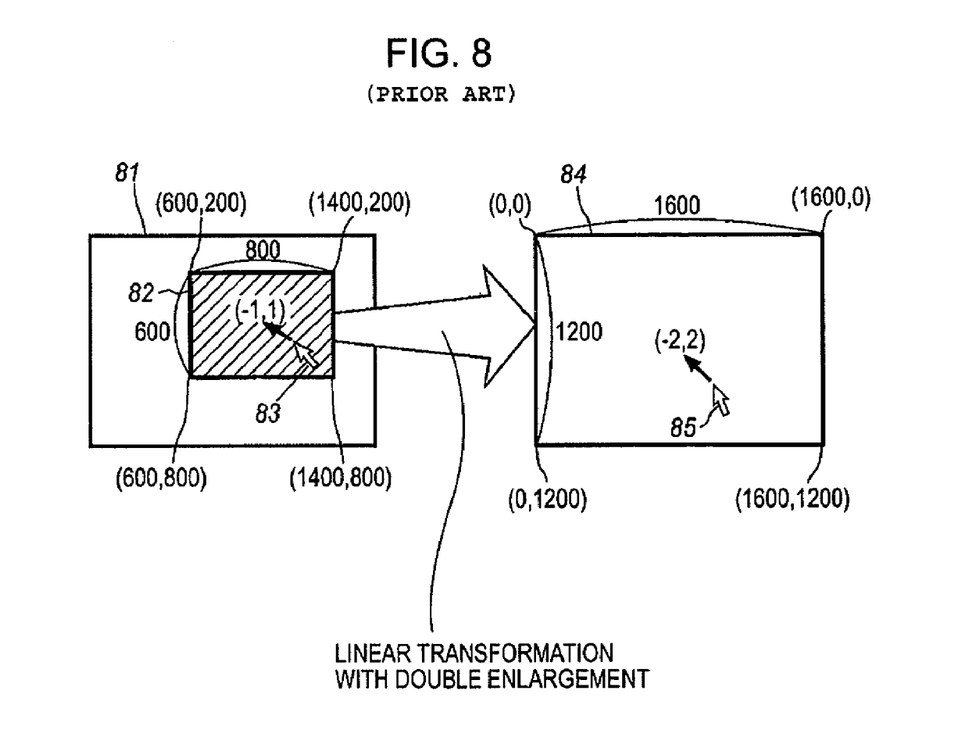
FIG. 8 schematically shows the relationship between a display screen produced on a display unit of a known remote-control apparatus and a display screen of a known apparatus to be controlled.

In particular, FIG. 8 shows a display screen (display area) 81 of the remote-control apparatus 62. The display screen 81 shows a remote-control screen 82, that is, a screen used for controlling the apparatus to be controlled 61 and a cursor (the pointer of a pointing device) 83. In the remote-control screen 82, coordinates are linearly transformed so that the apparatus to be controlled 61 is remotely controlled.

The cursor 83 is moved according to an input event transmitted by an input unit including a mouse, a keyboard, and so forth, so as to specify or drag an icon shown on the screen, for example. The coordinates of the cursor 83 shown on the remote-control screen 82 are determined to be (x, y).

FIG. 8 also shows a display screen 84 of the apparatus to be controlled 61. The display screen 84 produces the images of processing performed by the apparatus to be controlled 61 based on communications performed between the apparatus to be controlled 61 and the remote-control apparatus 62, a response output, and so forth. FIG. 8 further shows a cursor 85 shown on the display screen 84. The coordinates of the cursor 85 shown on the display screen 84 are determined to be (x', y').

In the above-described system, the details of processing performed by the apparatus to be controlled 61 are shown on the remote-control screen 82 in synchronization with the display screen 84. Further, where the user inputs predetermined information on the remote-control screen 82, the input event is transmitted to the apparatus to be controlled 61 via the network and the apparatus to be controlled 61 updates the details of the display screen produced on the display screen 84 based on the transmitted input event. For example, where a character is transmitted via the keyboard and the cursor is moved by operating the mouse on the remote-control screen 82, the event is transmitted to the apparatus to be controlled 61 and the result of processing performed based on the event is shown on the remote-control screen 82 and the display screen 84.

In FIG. 8, the remote-control screen 82 satisfies the expressions $600 \leq x \leq 1400$ and $200 \leq y \leq 800$, and the display screen 84 satisfies the expressions $0 \leq x' \leq 1600$ and $0 \leq y' \leq 1200$. In that case, the linear transformation including the enlargement and/or reduction transformation is achieved by the translation by as much as (−600, −200) and double enlargement in the directions x and y.

On the other hand, a linear-transformation method using translation alone is also known. Namely, the remote-control screen 82 is associated with part of the display screen 84 and the controllable area thereof is scrolled by using a scroll bar or the like. Subsequently, the entire common screen (the display screen 84) becomes controllable. More specifically, the remote-control screen 82 and the scroll bar or the like are shown on the display screen 81, and the expression of the linear transformation is updated every time the scroll is performed so that the entire display screen 84 becomes controllable.

In the above-described remote-control system, the remote control is performed by moving the cursor onto the remote-control screen 82 and transmitting information. Further, other applications running on the remote-control apparatus 62 can be controlled by moving the cursor away from the remote-control screen 82 and transmitting information.

However, when the linear transformation includes the enlargement and/or reduction transformation, every point shown on the display screen 84 of the apparatus to be controlled 61 cannot be specified via the remote-control apparatus 62. For example, when the remote-control system has the configuration shown in FIG. 8, the event that the cursor 83 is moved by as much as (−1, −1) in the remote-control screen 82 corresponds to the event that the cursor 85 is moved by as much as (−2, −2) in the display screen 84. Therefore, if the cursor 85 is at the position corresponding to the coordinates (x', y') on the display screen 84, for example, the remote-control apparatus 62 cannot control and move the cursor 85 to the place corresponding to the coordinates (x'−1, y'−1).

The above-described problem becomes significant as the difference between the resolution of the remote-control screen 82 and that of the display screen 84 becomes larger. For example, it becomes impossible to specify a small point and/or a little button by performing remote control. Further, if a user draws an image by using the path of cursor movement, it becomes impossible for the user to draw a smooth line.

Further, according to the above-described method wherein the controllable area is scrolled by the scroll bar or the like so that the entire display screen 84 becomes controllable, an area that can be controlled at a time is limited to the part shown on the remote-control screen 82. Therefore, a scrolling operation is required for controlling a part not shown on the remote-control screen 82, which places a burden upon the user. The above-described problem becomes more significant as the difference between the resolution of the remote-control screen 82 and that of the display screen 84 becomes larger.

SUMMARY OF THE INVENTION

Accordingly, the present invention provides a technology that allows specifying every point shown on a screen to be controlled by performing an easy operation, if the resolution of the display screen of a remote-control apparatus is different from that of the display screen of an apparatus to be controlled.

The present invention provides a remote-control system having at least one remote-control apparatus and at least one apparatus to be controlled that are connected to each other via a network. The remote-control system includes an input unit configured to transmit a control event used for controlling the apparatus to be controlled by the remote-control apparatus, a generation unit configured to generate a first control amount of a first coordinate space displayed by the apparatus to be controlled based on a second control amount of the control event transmitted from the input unit; and a control unit configured to control the apparatus to be controlled based on the first control amount.

Further features and aspects of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate various embodiments and aspects of the invention and, together with the description, serve to explain the principles of the present invention.

DESCRIPTION OF THE EMBODIMENTS

Various embodiments and aspects of the present invention will now be described in detail in accordance with the accompanying drawings. It is to be noted that elements disclosed in the embodiments are exemplary described, so that the scope of the present invention is not limited thereto.

First Exemplary Embodiment

[Configuration of Remote-Control System]

Figure 1:
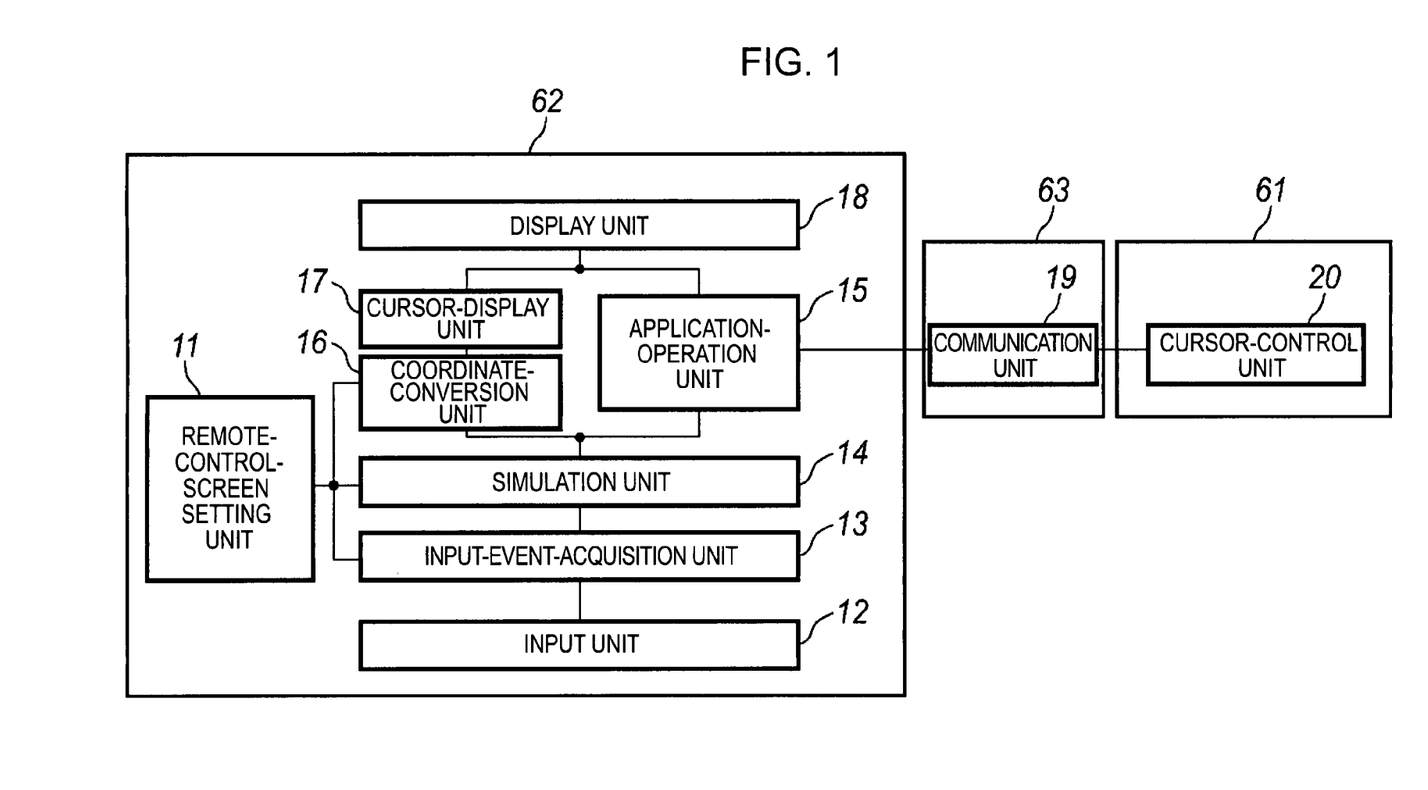
FIG. 1 is a block diagram illustrating an exemplary configuration of a remote-control system according to a first embodiment of the present invention.

FIG. 1 is a block diagram illustrating the configuration of a remote-control system according to a first embodiment of the present invention. An exemplary remote control system includes at least one remote-control apparatus, a communication network, and an apparatus to be controlled 61. A plurality of remote-control apparatuses 62 are provided and connected to the apparatus to be controlled 61 via a communication network 63. A user remotely controls the apparatus to be controlled 61 by operating the remote-control apparatus 62. An image of the details of data transmitted from the apparatus to be controlled 61 is produced on an output apparatus.

In particular, the remote-control apparatus 62 includes a remote-control-screen setting unit 11, an input unit 12, an input-event-acquisition unit 13, a simulation unit 14, an application-operation unit 15, a coordinate-conversion unit 16, a cursor-display unit 17, and a display unit 18. The communication network 63 includes a communication unit 19 and the apparatus to be controlled 61 includes a cursor-control unit 20. In the above-described system, the remote-control apparatus 62 remotely controls the apparatus to be controlled 61 via the communication network 63. The apparatus to be controlled 61 includes a cursor-control unit 20 and an output apparatus, such as a large display, a projector, and so forth.

The remote-control-screen setting unit 11 sets a remote-control screen 26 shown in FIG. 2 that will be described later on a display screen 25 shown in FIG. 2 of the remote-control apparatus 62 and sets and/or updates the remote-control system, for example, by controlling processing including coordinate conversion or the like based on the resolution of the remote-control screen 26 and that of the apparatus to be controlled 61. The input unit 12 may be, for example, a keyboard or a pointing device such as a coordinate-input device, a mouse, a touch panel and so forth. The user transmits data on a coordinate-shift amount and/or a button-input event, a control command, and so forth to the remote-control apparatus 62 by using the input unit 12. The input-event-acquisition unit 13 acquires an input event generated in the remote-control screen 26 set by the remote-control-setting unit 11. The input event may be, for example, the movement of a cursor, a mouse-button input event, a text-input event, etc.

Figure 2:
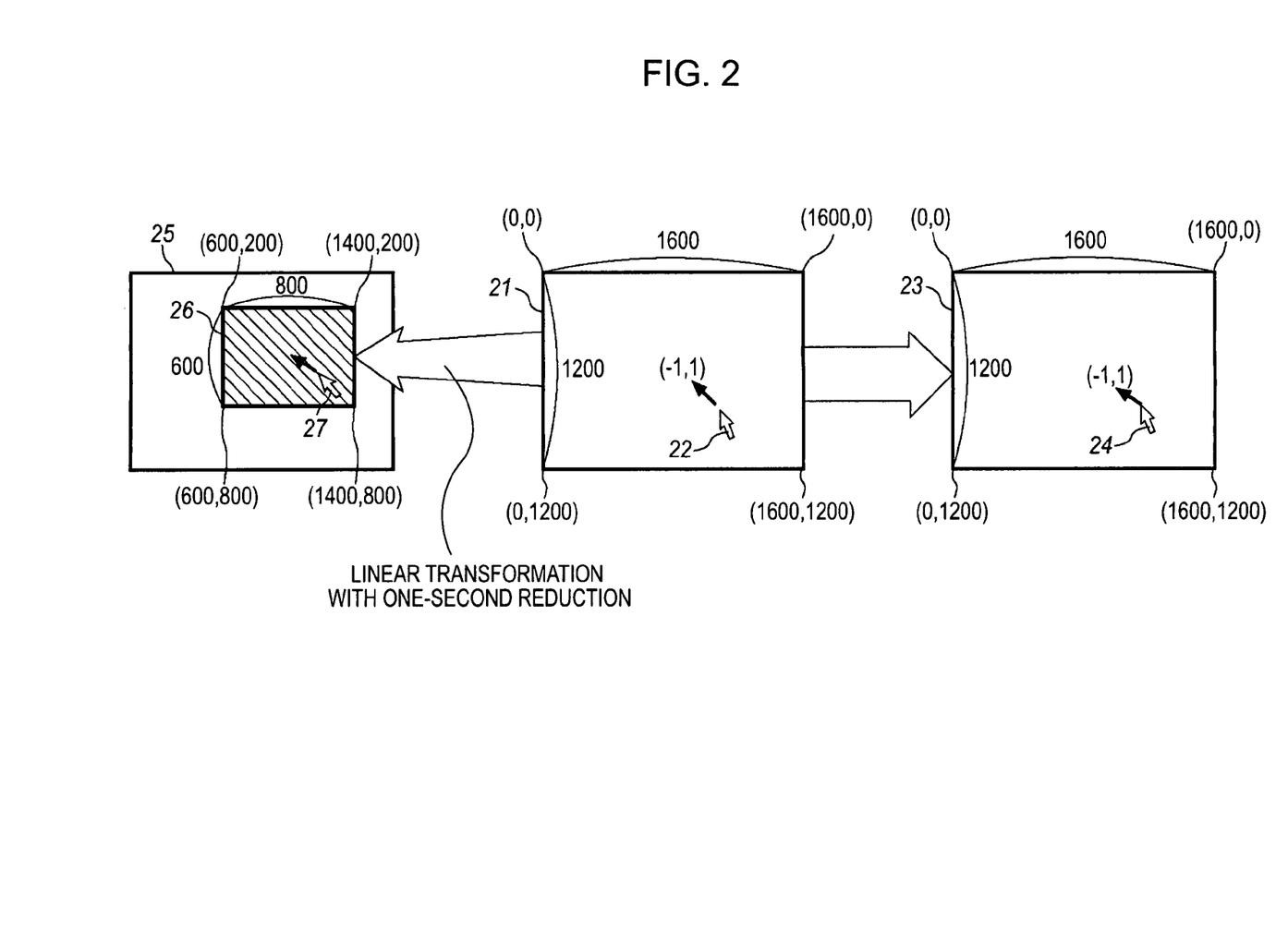
FIG. 2 schematically shows an exemplary relationship between a display screen produced on a display unit of a remote-control apparatus according to the first embodiment and a display screen of an apparatus to be controlled.

The simulation unit 14 performs control so that a reduced screen of a display screen 23 shown in FIG. 2 of the apparatus to be controlled 61 is displayed on the remote-control screen 26. Further, the simulation unit 14 controls processing performed based on an input event that occurs in the remote-control screen 26. The details of the processing will be described later. Further, the simulation unit 14 performs control so that remote control for the apparatus to be controlled 61 is started and/or terminated based on a predetermined event, namely, where the cursor enters the remote-control screen 26. Further, when the remote control is started, the simulation unit 14 performs predetermined initialization, as will be described later.

The application-operation unit 15 performs remote control based on the control result of the simulation unit 14. Here, the application-operation unit 15 transmits data on an input event to the apparatus to be controlled 61 by using the communication unit 19 that will be described later. Further, upon receiving information such as data on the display screen 23 transmitted from the communication unit 19, the application-operation unit 15 transmits the information to the simulation unit 14, thereby updating a virtual area 21. Then, the application-operation unit 15 updates an information image produced on the remote-control screen 26 based on the details of the updated virtual area 21.

The coordinate-conversion unit 16 converts coordinates indicated by the simulation unit 14 into those shown on the remote-control screen 26 of the remote-control apparatus 62 based on information about the display resolution of the remote-control screen 26 set by the remote-control-screen setting unit 11 and the display resolution of the display screen 23 of the apparatus to be controlled 61. The details of the conversion will be described later.

The cursor-display unit 17 instructs the display unit 18 (described later) to show the cursor at the position of the coordinates converted by the coordinate-conversion unit 16. The display unit 18 is typically an output device, namely, a display configured to produce the remote-control screen 26, the cursor, and so forth based on information about a processing result, a command, and so forth, where the information is transmitted from the cursor-display unit 17 and/or the application-operation unit 15.

The communication unit 19 controls communications performed between the application-operation unit 15 and the cursor-control unit 20 of the apparatus to be controlled 61 via the communication network 63. Where an execution event is transmitted from the remote-control apparatus 62 via the communication unit 19, the cursor-control unit 20 performs an execution event in the apparatus to be controlled 61.

It is noted that the aforementioned described elements indicated by reference numerals 11 to 20 of the remote-control system may be either implemented as hardware and/or software.

[Overview of Remote Control]

An overview of the remote control according to the first embodiment will now be described with reference to FIG. 2, which schematically shows the relationship among a display screen produced on the display unit 18 (see FIG. 1) of the remote-control apparatus 62, a display screen of the apparatus to be controlled 61, and a virtual area 21 held in the remote-control apparatus 62.

In particular, the virtual area 21 is held by the simulation unit 14 in synchronization with the details of a display image produced on the display screen 23 of the apparatus to be controlled 61. The simulation unit 14 performs, for example, display control for a cursor 22 shown in the virtual area 21 based on an input event. The coordinates of the cursor 22 are determined to be (x', y').

The display screen 23 is included in the apparatus to be controlled 61 and configured to produce, for example, an image of the result of processing performed by the apparatus to be controlled 61. The display screen 23 produces an image of the result of remote control performed by the application-operation unit 15 for the apparatus to be controlled 61. A cursor 24 is shown on the display screen 23. As described above, the details of an image produced on the display screen 23 are synchronized with those of the virtual area 21 held by the simulation unit 14 and the coordinates of the cursor 24 are determined to be (x', y').

The display screen 25 of the remote-control apparatus 62 is configured to show the remote-control screen 26 and the cursor 27 thereon. The remote-control screen 26 is configured to control the apparatus to be controlled 61 in the area thereof and show a reduced screen of the virtual area 21. The input-event acquisition unit 13 acquires an input event that occurs in the remote-control screen 26. The coordinates of the cursor 27 shown on the display screen 25 are determined to be (x, y).

Still referring to FIG. 2, the remote-control screen 26 is formed, as a rectangular and/or square area satisfying the expressions $600 \leq x \leq 1400$ and $200 \leq y \leq 800$. The display screen 23 is formed, as a rectangular and/or square area satisfying the expressions $0 \leq x' \leq 1600$ and $0 \leq y' \leq 1200$. Since the virtual area 21 has the same size as that of the display screen 23, it is formed, as the rectangular and/or square area satisfying the expressions $0 \leq x' \leq 1600$ and $0 \leq y' \leq 1200$.

In that case, the remote-control screen 26 and the display screen 23 are similar to each other at the similarity ratio of 1:2. Therefore, the simulation unit 14 performs control so that the coordinate-conversion unit 16 translates the details of the virtual area 21 in the direction of the point (600, 200). Subsequently, the details of the virtual area 21 are linearly transformed with one-second reduction in the direction of the coordinates (x', y'). The reduced details of the virtual area 21 are shown on the remote-control apparatus 62, as the remote-control screen 26. Further, where the application-operation unit 15 shows the display screen 23 transmitted from the communication unit 19 on the remote-control screen 26, the simulation unit 14 performs control so that the application-operation unit 15 associates the details of the display screen 23 with the virtual area 21, translates the details in the direction of the point (600, 200), and linearly transforms the details in the direction of the coordinates x' and y' with one-second reduction. Subsequently, the linearly-transformed details are shown.

[Coordinate-Conversion Unit]

Next, the linear transformation performed by the coordinate-conversion unit 16 will be described. The remote-control screen 26 is formed, as a rectangular and/or square area satisfying the expressions $Xmin \leq x \leq Xmax$ and $Ymin \leq y \leq Ymax$, and the virtual area 21 is formed, as a rectangular and/or square area satisfying the expressions $X'min \leq x' \leq X'max$ and $Y'min \leq y' \leq Y'max$. In that case, the relationship between indication the coordinates (x, y) shown on the display screen 25 and the indication coordinates (x', y') shown on the virtual area 21, that is, the display screen 23 is determined, as below.
(Expressions 1)

$$x = X_{min} + \frac{X_{max} - X_{min}}{X'_{max} - X'_{min}}(x' - X'_{min})$$

$$y = Y_{min} + \frac{Y_{max} - Y_{min}}{Y'_{max} - Y'_{min}}(y' - Y'_{min})$$

That is to say, either the coordinates (x, y) or the coordinates (x', y') can be calculated based on each other by performing the above-described translation and linear transformation with reduction and/or enlargement of the screen size. The coordinate-conversion unit 16 calculates the coordinates (x, y) based on the coordinates (x', y') according to the above-described expressions, and determines integer coordinates nearest to the coordinates (x, y) to be transformed coordinates. After that, the reduced screen of the virtual area 21, that is, the display screen 23 is shown on the display unit 18 under the control of the simulation unit 14.

[Flow of Processing]

Figure 7:
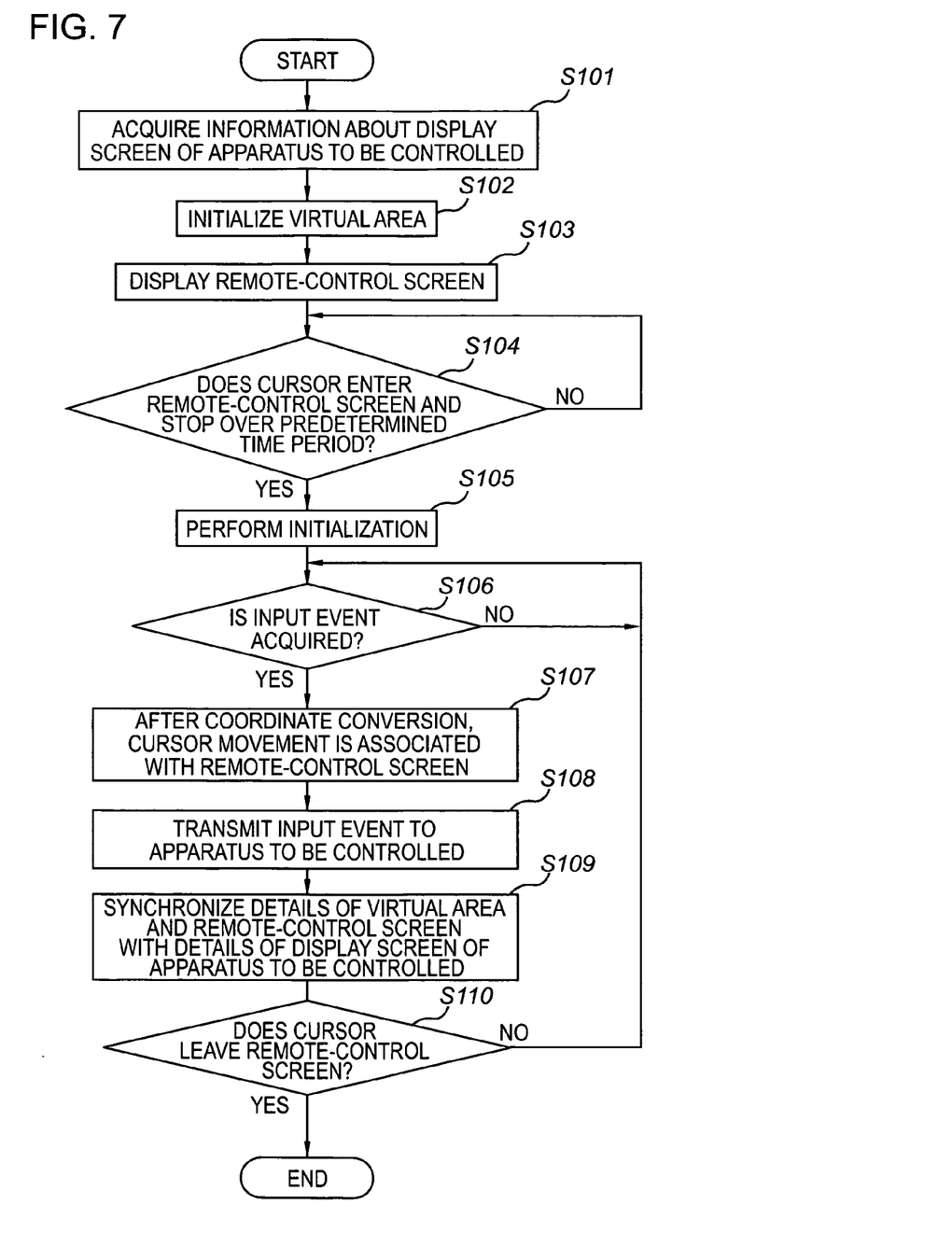
FIG. 7 is a flowchart illustrating an exemplary process flow from when the remote-control apparatus is started to when the remote-control apparatus is terminated.

FIG. 7 is a flowchart illustrating a series of processing procedures from when the remote-control apparatus 62 is started, to when the remote-control apparatus is terminated.
(Setting Up)

After being started, at step S101, the remote-control apparatus 62 communicates with the apparatus to be controlled 61 via the communication network 63 and acquires information about the display screen 23. The above-described processing is performed mainly by the application-operation unit 15. Further, the information about the display screen 23 includes information about the resolution and details of the display screen 23.

At step S102, the remote-control apparatus 62 initializes the virtual area 21 based on the acquired information about the display screen 23 so that at least the resolution and details of the virtual area 21 become the same as those of the display screen 23. The above-described processing is performed mainly by the simulation unit 14. Then, at step S103, the remote-control-screen setting unit 11 shows the reduced screen of the virtual area 21 on the display screen 25 of the display unit 18, as the remote-control screen 26. At that time, the coordinate-conversion unit 16 performs the linear-conversion processing. From then on, the user can start remotely controlling the apparatus to be controlled 61.

The remote-control apparatus 62 monitors an instruction transmitted from the input unit 12 and waits until an event that the cursor 27 flows into the remote-control screen 26 from the area outside the remote-control screen 26 occurs. If such an event occurs, that is, where the answer is YES, at step S104, the flow proceeds to step S105. If the above-described event does not occur, that is, where the answer is NO, at step S104, the remote-control apparatus keeps on waiting.
(Initialization)

At step S105, initialization is performed under the control of the simulation unit 14. Namely, the cursor 27 is moved from the point (x1, y1) outside the remote-control screen 26 to the point (x2, y2) in the remote-control screen 26 according to an instruction transmitted to the input unit 12. When the cursor 27 is not moved over a predetermined time period, that is, where the answer is YES, at step S104, the simulation unit 14 performs control so that the coordinates (x', y') of the cursor 22 shown in the virtual area 21 are set to values shown by the following expressions.

(Expressions 2)

$$x' = \begin{cases} X'_{min} & (x1 < X_{min} \ \& \ X_{min} < x2) \\ X'_{min} + \frac{X'_{max} - X'_{min}}{X_{max} - X_{min}}(x2 - X_{min}) & (X_{min} < x1 < X_{max} \ \& \\ & X_{min} < x2 < X_{max}) \\ X'_{max} & (X_{max} x1 \ \& \ x2 < X_{max}) \end{cases}$$

$$y' = \begin{cases} Y'_{min} & (y1 < Y_{min} \ \& \ Y_{min} < y2) \\ Y'_{min} + \frac{Y'_{max} - Y'_{min}}{Y_{max} - Y_{min}}(y2 - Y_{min}) & (Y_{min} < y1 < Y_{max} \ \& \\ & Y_{min} < y2 < Y_{max}) \\ Y'_{max} & (Y_{max} < y1 \ \& \ y2 < Y_{max}) \end{cases}$$

Further, the simulation unit 14 performs control so that the display screen 23 is synchronized with the virtual area 21 and the reduced screen of the virtual area 21 is shown on the remote-control screen 26. For example, in the case of FIG. 2, the expressions Xmin=600, Ymin=200, Xmax=1400, Ymax=800, X'min=0, Y'min=0, X'max=1600, and Y'max=1200 are satisfied.

Figure 3A:
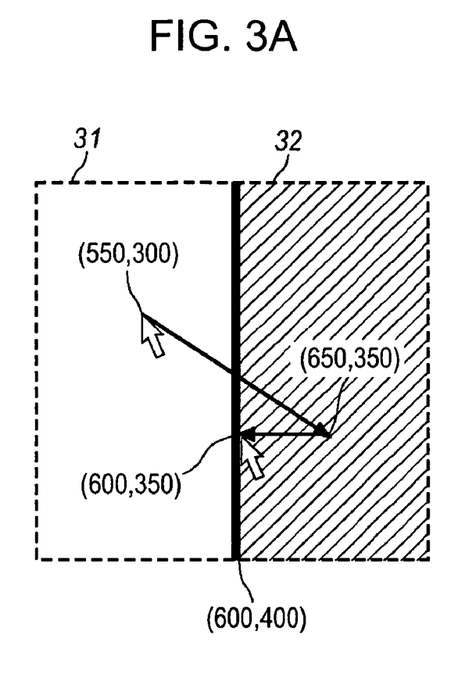
FIG. 3A shows an exemplary initialization processing performed for starting remote control.
Figure 3B:
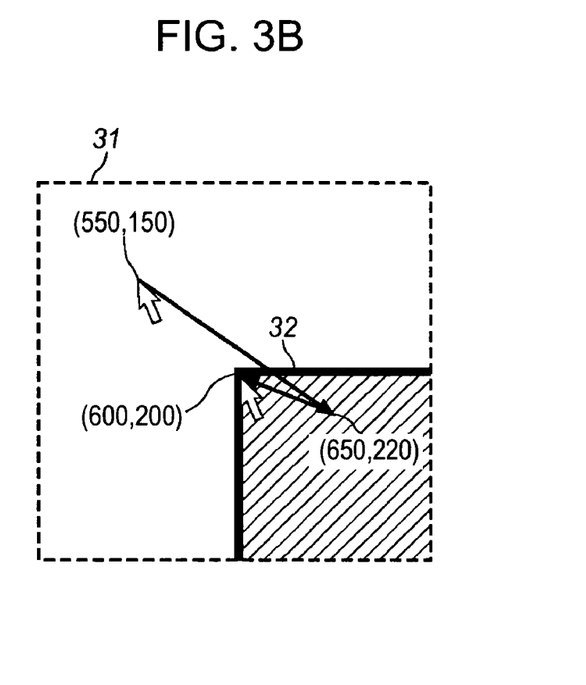
FIG. 3B shows another exemplary initialization processing performed for starting the remote control.

FIGS. 3A and 3B exemplary show how the coordinates (x', y') of the cursor 22 shown on the virtual area 21 are initialized. In FIGS. 3A and 3B, reference numeral 31 denotes the display screen 25 of the remote-control apparatus 62 and reference numeral 32 denotes the remote-control screen 26. The position and size of the remote-control screen 26 and the size of the virtual area 21 that are shown in FIGS. 3A and 3B are the same as those shown in FIG. 2.

In FIG. 3A, the point (x1, y1) corresponds to the point (550, 300), and the point (x2, y2) corresponds to the point (650, 350). Further, the conditions "x1<Xmin & Xmin<x2" and "Ymin<y1<Ymax & Ymin<y2<Ymax" are satisfied. Therefore, the simulation unit 14 performs control so that the coordinates (x', y') of the cursor 22 shown on the virtual area 21 are initialized (set) at the position of the point (0, 300) corresponding to the point shown as the expression (Xmin, y2)= (600, 350). Further, the simulation unit 14 performs control so that a cursor 24 shown on the display screen 23 is set at the position of the coordinates that are the same as those of the cursor 22. Further, the simulation unit 14 performs control so that the cursor 27 shown on the display screen 25 is set at the position indicated by the expression (Xmin, y2)=(600, 350) corresponding to the position of the cursor 27.

In FIG. 3B, the point (x1, y1) corresponds to the point (550, 150), and the point (x2, y2) corresponds to the point (650, 220). Further, the conditions "x1<Xmin & Xmin<x2" and "y1<Ymin & Ymin<y2" are satisfied. Therefore, the simulation unit 14 performs control so that the coordinates (x', y') of the cursor 22 shown on the virtual area 21 are initialized (set) at the position of the point (0, 0) corresponding to the point shown by the expression (Xmin, Ymin)=(600, 200). Further, the simulation unit 14 performs control so that the cursor 24 shown on the display screen 23 is set at the position of the coordinates that are the same as those of the cursor 27. Further, the simulation unit 14 performs control so that the cursor 27 shown on the display screen 25 is set at the position indicated by the expression (Xmin, Ymin)=(600, 200) corresponding to the position of the cursor 27.

After the above-described initialization is performed, the flow then proceeds to step S106, where the remote control is started.

(Remote Control)

At step S106, the remote-control apparatus 62 waits until a predetermined input event is transmitted to the input-event-acquisition unit 13 under the control of the simulation unit 14. When the input event is transmitted, that is, where the answer is YES, at step S106, the flow proceeds to step S107. Otherwise, that is, where the answer is NO, at step S106, the remote-control apparatus 62 keeps on waiting.

At step S107, the coordinates of the cursor 22 shown on the virtual area 21 of the simulation unit 14 are updated based on the transmitted input event, and the coordinates of the input event are converted into the coordinates of the cursor 22. Further, the coordinate-conversion unit 16 performs linear transformation for the details thereof and updates the details of the remote-control screen 26 and the cursor 27 under the control of the cursor-display unit 17.

Next, at step S108, the input event converted, at step S107 is transmitted to the apparatus to be controlled 61, as an event that occurs in the coordinate space of the display screen 23 of the apparatus to be controlled 61. The above-described transmission is controlled by the application-operation unit 15. The apparatus to be controlled 61 performs processing based on the transmitted input event, so as to update the details of a screen shown on the display unit 23.

Next, at step S109, the apparatus to be controlled 61 transmits information about the screen shown on the display unit 23 to the remote-control apparatus 62. The application-operation unit 15 transmits the transmitted screen information to the simulation unit 14, and the details of the virtual area 21 are updated. Then, the coordinate-conversion unit 16 performs linear transformation based on the updated details of the virtual area 21 and the details of the linear-transformed details are associated with those of the remote-control screen 26.

Here, an example where the remote-control screen 26 and the display screen 23 are similar to each other at the similarity ratio of 1:4 is considered. If information about an event is input so that the cursor is moved to the right by as much as one hundred pixels during the remote control is performed, the simulation unit 14 performs control so that the coordinates of the input event are converted to those of an event adapted to move the cursor 22 in the virtual area 21 to the right by as much as one hundred pixels and the event is transmitted to the apparatus to be controlled 61, as an event that occurs in the coordinate space of the display screen 23. The above-described conversion and transmission are achieved due to the fact that the coordinate space of the virtual area 21 is the same as that of the display screen 23, since the virtual area 21 is displayed to the same scale as that of the display screen 23. The display screen 23 shows how the cursor is moved to the right by as much as one hundred pixels based on the transmitted event. Further, the remote-control screen 26 shows how the cursor 27 is moved to the right by as much as twenty-five pixels (one-fourth of one hundred pixels).

If information about a predetermined event is detected during the remote control, that is to say, when the cursor 27 leaves the remote-control screen 26, so that the answer is YES, at step S110, the processing is terminated. If the above-described event is not detected, that is to say, where the answer is NO, at step S110, the flow then returns to step S106 so that the remote control is continued.

Thus, according to the first embodiment, the event information transmitted by the user is transmitted to the apparatus to be controlled 61, as the event that occurs in the coordinate space of the apparatus to be controlled 61 so that the information displayed on the display screen 23 is controlled. Subsequently, the user can specify every coordinate point shown on the display screen 23 via the remote-control apparatus 62.

Further, since the details of information shown on the display screen 23 are synchronized with those of information shown on the remote-control screen 26 and the virtual area 21, the user can use either of the remote-control screen 26 and the display screen 23 for performing the remote control.

Further, the simulation unit 14 performs control, so as to start and/or terminate the remote control based on a predetermined event, that is to say, where the cursor enters or leaves the remote-control screen 26. Subsequently, the user can start and/or terminate the remote control by performing a simple operation without conscious effort.

Therefore, if information-processing apparatuses with different resolutions including a notebook PC, a mobile down-sized terminal, and so forth are used, as terminals used for an electronic-conference system, it becomes possible to specify and/or operate every coordinate point shown by an apparatus to be controlled.

FIG. 6 shows the example where the electronic-conference system includes a plurality of the remote-control apparatuses 62. Each of the remote-control-screen setting unit 11, the input unit 12, the input-event-acquisition unit 13, the simulation unit 14, the application-operation unit 15, the coordinate-conversion unit 16, the cursor-display unit 17, and the display unit 18 of each of the remote-control apparatuses 62 performs predetermined processing. Therefore, if the sizes of the remote-control screens 26 of the remote-control apparatuses 62 are different from one another, the remote-control apparatuses 62 can control the single apparatus to be controlled 61 at the same time.

As described above, the simulation unit 14 of each of the remote-control apparatuses 62 holds the same coordinate space (the virtual area 21) as that displayed by the apparatus to be controlled 61, so as to control remote-control operations. Therefore, communications performed between the remote-control apparatus 62 and the apparatus to be controlled 61 are isolated from those performed between other remote-control apparatuses 62 and the apparatus to be controlled 61. Subsequently, when the electronic-conference system includes the plurality of remote-control apparatuses 62, as shown in FIG. 6, each of the remote-control screens 26 can perform the remote control independently, since each of the remote-control apparatuses 62 has the simulation unit 14. Therefore, if the sizes of the remote-control screens 26 of the remote-control apparatuses 62 are different from one another, the remote-control apparatuses 62 can control the single apparatus to be controlled 61 at the same time. Further, where the remote-control apparatuses 62 control the single apparatus to be controlled 61 at the same time, a display screen (not shown) connected to the apparatus to be controlled 61 produces the images of cursors corresponding to the remote-control apparatuses 62, for example.

Second Exemplary Embodiment

Figure 4:
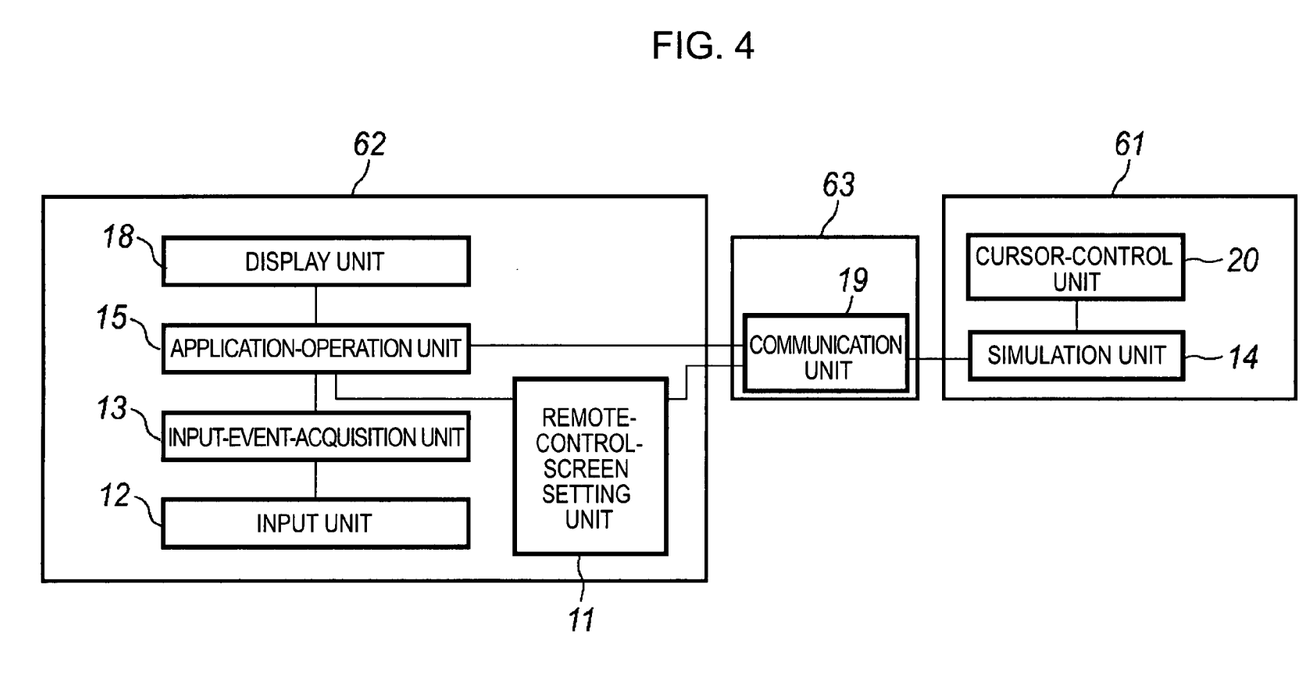
FIG. 4 is a block diagram illustrating an exemplary configuration of a remote-control system according to a second embodiment of the present invention.

According to the first embodiment, each of the remote-control apparatuses 62 includes all of the elements (from FIG. 1), that is, the remote-control-screen setting unit 11, the input unit 12, the input-event-acquisition unit 13, the simulation unit 14, the application-operation unit 15, the coordinate-conversion unit 16, the cursor-display unit 17, and the display unit 18. According to a second embodiment of the present invention, however, the simulation unit 14 is provided in the apparatus to be controlled 61. FIG. 4 is a block diagram illustrating the configuration of a remote-control system according to the second embodiment.

The elements of the remote-control system of the second embodiment function in the same way as those of the remote-control system of the first embodiment do. That is to say, the second embodiment provides the same configuration as that of the first embodiment except that the apparatus to be controlled 61 includes the cursor-control unit 20 and the remote-control apparatus 62 does not include the cursor-display unit 17. Further, operations of the simulation unit 14 and the application-operation unit 15 are different from those of the first embodiment. Where the cursor 27 enters the remote-control screen 26 on the display screen 25, the application-operation unit 15 performs control so that relative coordinates of the cursor 27 shown on the remote-control screen 26 are calculated and information about the relative coordinates is transmitted to the simulation unit 14 of the apparatus to be controlled 61. The simulation unit 14 initializes the cursor 22 shown in the virtual area 21 based on the relative-coordinates information transmitted from the application-operation unit 15. From then on, the remote control is performed.

Information about a mouse event or the like that occurs during the remote control is transmitted from the application-operation unit 15 to the simulation unit 14, as an event that occurs in the coordinate space of the apparatus to be controlled 61. The simulation unit 14 updates, for example, the coordinates of the cursor 22 shown in the virtual area 21 by the mouse event. Further, the simulation unit 14 transmits information about the cursor 22 shown in the virtual area 21 to the cursor-control unit 20. The cursor-control unit 20 controls the details of an image produced on the display screen 23 based on the transmitted information. However, if the cursor 22 leaves the virtual area 21, the simulation unit 14 instructs the application-operation unit 15 to terminate the remote control.

According to the second embodiment, the remote-control apparatus 62 does not produce the image of a cursor when the remote control is performed. That is to say, the cursor image is not produced on the display screen 25. Therefore, the user performs the remote control by seeing the display screen 23 of the apparatus to be controlled 61, or the display screen 23 shown on the remote-control screen 26. If the cursor 27 leaves the remote-control screen 26 (the display screen 23), the remote-control apparatus 62 terminates the remote control so that the cursor image is produced again.

As is the case with the first embodiment, where the electronic-conference system includes the plurality of remote-control apparatuses 62, as shown in FIG. 6, the simulation unit 14 is provided and managed in each of the remote-control apparatuses 62 so that settings can be made according to the size of the remote-control screen 26. Subsequently, if the sizes of the remote-control screens 26 of the remote-control apparatuses 62 are different from one another, the remote-control apparatuses 62 can control the single apparatus to be controlled 61 at the same time. Further, where the remote-control apparatuses 62 control the single apparatus to be controlled 61 at the same time, a display (not shown) connected to the apparatus to be controlled 61 produces the images of cursors corresponding to the remote-control apparatuses 62.

Third Exemplary Embodiment

Figure 5:
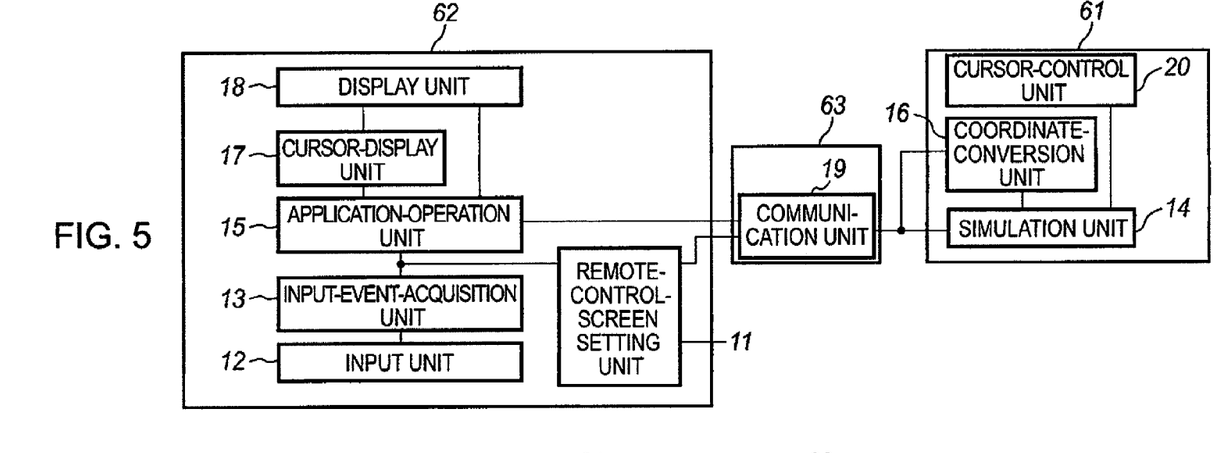
FIG. 5 is a block diagram illustrating an exemplary configuration of a remote-control system according to a third embodiment of the present invention.

FIG. 5 is a block diagram illustrating a remote-control system according to a third embodiment of the present invention. In the remote-control system, the simulation unit 14 and the coordinate-conversion unit 16 are provided in the apparatus to be controlled 61.

The elements of the remote-control system of the third embodiment function in the same way as those of the remote-control systems of the first and second embodiments do. That is to say, the third embodiment provides the same configuration as those of the first and second embodiments except that the apparatus to be controlled 61 includes the simulation unit 14 and the coordinate-conversion unit 16. Further, operations of the simulation unit 14, the application-operation unit 15, and the coordinate-conversion unit 16 are different from those of the first and second embodiments.

When the cursor 27 enters the remote-control screen 26 on the display screen 25, the application-operation unit 15 performs control so that relative coordinates of the cursor 27 in the remote-control screen 26 are calculated and information about the relative coordinates is transmitted to the simulation unit 14 of the apparatus to be controlled 61. The simulation unit 14 initializes the cursor 22 shown in the virtual area 21 based on the relative-coordinates information transmitted from the application-operation unit 15. At that time, remote control is started.

Information about a mouse event or the like that occurs during the remote control is transmitted from the application-operation unit 15 to the simulation unit 14, as an event that occurs in the coordinate space of the apparatus to be controlled 61. The simulation unit 14 updates, for example, the coordinates of the cursor 22 shown in the virtual area 21 by a mouse event. Further, the simulation unit 14 transmits information about the cursor 22 shown in the virtual area 21 to the coordinate-conversion unit 16 and the cursor-control unit 20. The cursor-control unit 20 controls the details of an image produced on the display screen 23 based on the transmitted information. However, if the cursor 22 leaves the virtual area 21, the simulation unit 14 instructs the application-operation unit 15 to terminate the remote control.

The coordinate-conversion unit 16 converts indication coordinates shown by the simulation unit 14 into those shown on the remote-control screen 25 of the remote-control apparatus 62 based on information about the display resolution of the remote-control screen 26 set by the remote-control-screen setting unit 11 and the display resolution of the apparatus to be controlled 61. Information about the converted coordinates is transmitted to the application-operation unit 15. The application-operation unit 15 transmits the information about the converted coordinates to the cursor-display unit 17.

As is the case with the first embodiment, wherein the electronic-conference system includes the plurality of the remote-control apparatuses 62, as shown in FIG. 6, the simulation unit 14 is provided and managed in each of the remote-control apparatus 62 so that settings can be made according to the size of the remote-control screen 26. Subsequently, if the sizes of the remote-control screens 26 of the remote-control apparatuses 62 are different from one another, the remote-control apparatuses 62 can control the single apparatus to be controlled 61 at the same time. Further, where the remote-control apparatuses 62 control the single apparatus to be controlled 61 at the same time, a display screen (not shown) connected to the apparatus to be controlled 61 produces the images of cursors corresponding to the remote-control apparatuses 62.

Fourth Exemplary Embodiment

[System Configuration]

Figure 9:
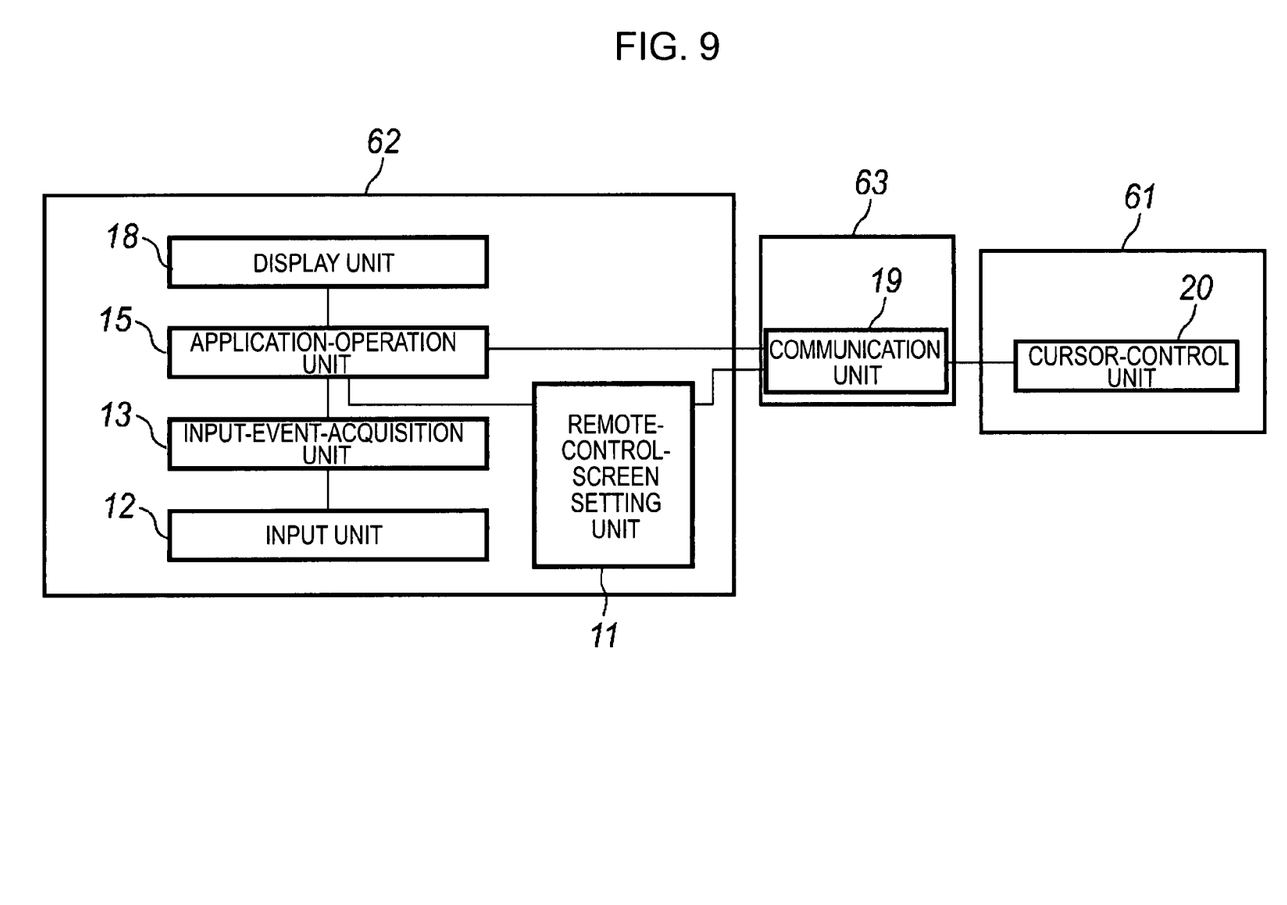
FIG. 9 is a block diagram illustrating an exemplary configuration of a remote-control system according to a fourth embodiment of the present invention.

According to the first, second, and third embodiments, the simulation unit 14 is provided in either the apparatus to be operated 61 or the remote-control apparatus 62. However, as shown in FIG. 9, which is a block diagram illustrating a remote-control system according to a fourth embodiment of the present invention, the simulation unit 14 is not provided.

The elements of the remote-control system of the fourth embodiment function in the same way as those of the remote-control systems of the first, second, and third embodiments do. That is to say, the fourth embodiment provides the same configuration as those of the first, second, and third embodiments except that the input-event information acquired by the input-event-acquisition unit 13 is directly transmitted to the cursor-control unit 20 by bypassing the simulation unit 14. The application-operation unit 15 performs control so that remote control is started at the time where the cursor 27 enters the remote-control screen 26 shown on the display screen 25 of the remote-control apparatus 62.

The information about an input event (e.g., a mouse event) transmitted via the input unit 12 of the remote-control apparatus 62 during the remote control is transmitted to the cursor-control unit 20 of the apparatus to be controlled 61 in its original state as acquired by the input-event-acquisition unit 13. The cursor-control unit 20 controls the movement of the cursor 24 of the apparatus to be controlled 61 based on the transmitted input-event information. Further, the cursor-control unit 20 checks whether or not termination requirements are satisfied based on an even related to the cursor 24. If the termination requirements are satisfied, the cursor-control unit 20 instructs the application-operation unit 15 to terminate the remote control. For example, when the cursor 24 leaves the display screen 23 and/or a termination button shown on the display screen 23 is clicked (selected), the termination requirements are satisfied.

[Flow of Processing]

Figure 10:
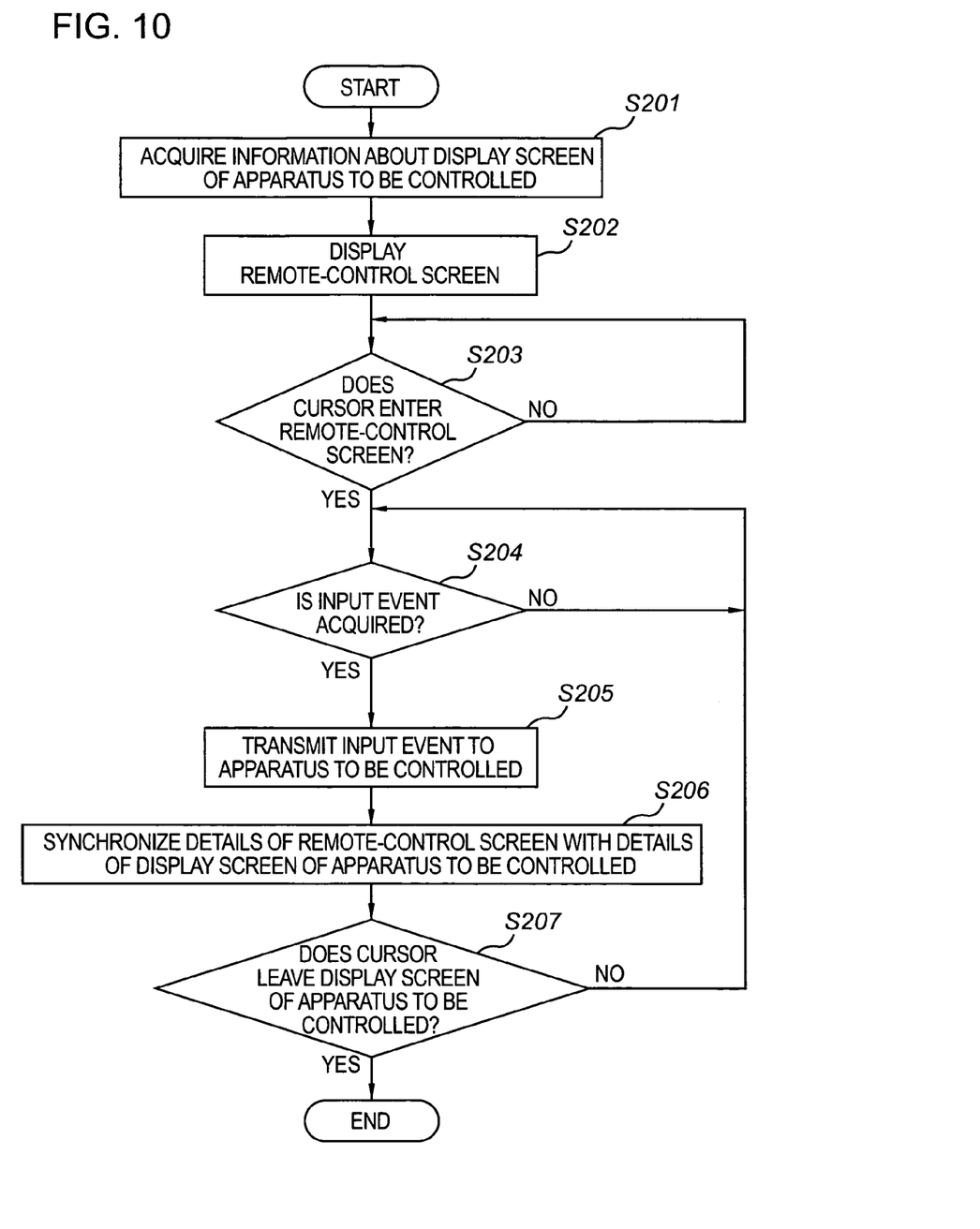
FIG. 10 is a flowchart illustrating an exemplary process flow from when a remote-control apparatus of the fourth embodiment is started to when the remote-control apparatus is terminated.

FIG. 10 is a flowchart illustrating a series of processing procedures from when the remote-control apparatus 62 is started, to when the remote-control apparatus 62 is terminated.

(Setting Up)

After being started, at step S201, the remote-control apparatus 62 communicates with the apparatus to be controlled 61 via the communication network 63 and acquires information about the display screen 23. The above-described processing is performed mainly by the remote-control-screen setting unit 11. Further, the acquired information about the display screen 23 includes information about the resolution and details of the display screen 23.

At step S202, the remote-control apparatus 62 shows the reduced screen of the display screen 23 on the display screen 25 of the display unit 18, as the remote-control screen 26 by using the application-operation unit 15. At that time, linear-conversion processing on the basis of the resolution of the display screen 23, where the resolution was acquired, at step S201 is performed. From then on, the user can start remotely controlling the apparatus to be controlled 61.

The remote-control apparatus 62 monitors an instruction transmitted from the input unit 12 and waits until an event that the cursor 27 flows into the remote-control screen 26 from the area outside the remote-control screen 26 occurs on the display screen 25 of the remote-control apparatus 62. If the above-described event occurs, that is, where the answer is YES, at step S203, the flow proceeds to step S204. If the above-described event does not occur, that is, where the answer is NO, at step S203, the remote-control apparatus 62 keeps on waiting.

(Remote Control)

At step S204, the remote-control apparatus 62 waits until a predetermined input event is transmitted to the input-event-acquisition unit 13 under the control of the application-operation unit 15. When the input event is transmitted, that is, where the answer is YES, at step S204, the flow proceeds to step S205. Otherwise, that is, where the answer is NO, at step S204, the remote-control apparatus 62 keeps on waiting.

At step S205, the input event acquired at step S204 is transmitted to the apparatus to be controlled 61, as an event that occurs in the coordinate space of the display screen 23 of the apparatus to be controlled 61. The above-described transmission is controlled by the application-operation unit 15. The apparatus to be controlled 61 performs processing based on the transmitted input event, so as to update the details of a screen shown on the display unit 23.

Next, at step S206, the apparatus to be controlled 61 transmits information about the details of the screen shown on the display unit 23 to the remote-control apparatus 62. The application-operation unit 15 of the remote-control apparatus 62 performs linear transformation for the transmitted screen information and associates the details of the linear transformation with the remote-control screen 26.

If information about a predetermined event wherein the cursor 27 leaves the display screen 23 during the remote control is performed is detected by the cursor-control unit 20, that is to say, where the answer is YES, at step S207, the apparatus to be controlled 61 informs the remote-control apparatus 62 of the detection. Upon receiving the information, the remote-control apparatus 62 terminates the processing. If the above-described event is not detected, that is to say, where the answer is NO, at step S207, the flow then returns to step S204 so that the remote control is continued.

Thus, even though the resolution of the display screen of the remote-control apparatus 62 is different from that of the display screen of the apparatus to be controlled 61, the configuration of the fourth embodiment allows specifying every coordinate point shown on the display screen 23 by performing an easy operation without using the simulation unit 14.

In the fourth embodiment, information is directly transmitted to the cursor-control unit 20. Subsequently, where the apparatus to be controlled 61 is operated by the plurality of remote-control apparatuses 62 at the same time, the cursor shown on the display screen of the apparatus to be controlled 61 is dragged in different directions. Therefore, where the electronic-conference system includes the plurality of the remote-control apparatuses 62, as shown in FIG. 6, only one of the remote-control apparatuses 62 is permitted to perform the remote control, as described below.

First, where the remote control is started, the application-operation unit 15 of each of the remote-control apparatuses 62 inquires of the cursor-control unit 20 about whether or not the remote control is currently performed. Upon receiving the inquiry, the apparatus to be controlled 61 determines whether or not the remote control is currently performed and transmits the result of the determination to the application-operation unit 15. Upon receiving the determination result indicating that the apparatus to be controlled 61 is remotely controlled, the remote-control apparatus 62 informs the user of the fact, so as not to start performing remote control. Subsequently, only one of the remote-control apparatuses 62 is permitted to perform remote control.

Other Exemplary Embodiments

As described in the aforementioned embodiments, the remote control is started and/or terminated based on the predetermined event wherein the cursor enters and/or leaves the remote-control screen 26. However, other events can be used, so as to trigger starting and/or terminating remote control. For example, an event with high operability can be used, as required, where the event includes, e.g., a predetermined operation of the input unit such as a keyboard, a mouse, and so forth, or inputting information through the input unit, an operation of a predetermined icon shown on the display screen, and so forth.

The present invention that has been described with reference to the above-described embodiments can be achieved, as a system, an apparatus, a method, a program, a recording medium, and so forth. More specifically, the present invention can be used for a system including a plurality of devices, or an apparatus including a single device.

Further, the present invention can be achieved by supplying program code configured to implement the functions of the above-described embodiments to a system or an apparatus directly or from a remote location so that a computer of the system or the apparatus reads and executes the transmitted program codes.

Therefore, the program code itself that is installed into the computer, so as to implement the functions of the present invention by the computer, is included in the technical scope of the present invention via the computer. That is to say, a computer program itself which is configured to achieve the functions of the present invention constitutes the present invention.

The above-described computer program may be, for example, object code, a program executed by an interpreter, script data to be supplied to an OS, and so forth, as long as it can function, as a program.

A storage medium for supplying the program may be, for example, a floppy (registered trademark) disk, a hard disk, an optical disk, a magneto-optical disk, an MO, a CD-ROM, a CD-R, a CD-RW, a magnetic tape, a non-volatile memory card, a ROM, a DVD including a DVD-ROM, a DVD-R, flash memory and so forth.

The program can be supplied in various manners. For example, a user can access a homepage on the Internet by using the browser of a client system so that a computer program or a compressed file that can be automatically installed into a computer of the present invention is downloaded from the homepage to a storage medium such as a hard disk. Further, program code of the program of the present invention can be divided into at least two files so that the files are downloaded from different homepages. That is to say, a WWW server that allows downloading program files configured to achieve the functions of the present invention by a computer to at least two users also constitutes the present invention.

Further, the program can also be supplied in another manner. First, a program generated according to the present invention is encrypted, stored in a storage medium such as a CD-ROM, and distributed to each user. Then, information about a decryption key is downloaded from a homepage to a user which satisfies predetermined conditions via the Internet. The encrypted program is executed by using the decryption-key information and installed into a computer of the user so that present invention is achieved.

In another embodiment of the present invention, a computer executes the read program, thereby achieving the above-described functions of the above-described embodiments. That is to say, an OS or the like running on the computer may execute part of or the entire process based on instructions of the program so that the functions described with reference to the above-described embodiments are achieved.

In another embodiment of the present invention, the program read from the storage medium may be written to a memory of a function extension board inserted into the computer or a function extension unit connected to the computer. Then, the functions described with reference to the above-described embodiments are achieved according to instructions of the program. That is to say, a CPU or the like provided in the function extension board or the function extension unit may execute part of or the entire process and thus achieving the functions described with reference to the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-335004 filed on Nov. 18, 2004 and No. 2005-214330 filed on Jul. 25, 2005, which are hereby incorporated by reference herein in their entirety.

What is claimed is:

1. A remote-control apparatus which is capable of remotely controlling an apparatus to be controlled via a network, the remote-control apparatus comprising:
    an input unit configured to input an event used for controlling the apparatus to be controlled; and
    a simulation unit configured to determine, based on the event input by the input unit, whether the controlling is performed in an area where a display screen displayed in the apparatus to be controlled is displayed, the area being displayed in the remote-control apparatus,
    wherein said simulation unit performs a moving amount of a cursor on a display screen in the remote-control apparatus based on a control amount of the input event, in a case where the simulation unit determines that the controlling is not performed in the area, and performs a moving amount of a cursor on a display screen in the remote-control apparatus by converting the control amount of the input event based on a size ratio between a size of the display screen displayed in the apparatus to be controlled and a size of the area, in a case where the simulation unit determines that the controlling is performed in the area.

2. A remote-control method by a remote-control apparatus capable of remotely controlling an apparatus to be controlled via a network, the remote-control method comprising:
    an input step of inputting an event used for controlling the apparatus to be controlled;
    a simulation step of determining, based on the input event, whether the controlling is performed in an area where a display screen displayed in the apparatus to be controlled is displayed, the area being displayed in the remote-control apparatus; and
    a control step of performing a moving amount of a cursor on a display screen in the remote-control apparatus based on a control amount of the input event, in a case where the simulation step determines that the controlling is not performed in the area, and performing a moving amount of a cursor on a display screen in the remote-control apparatus by converting the control amount of the input event based on a size ratio between a size of the display screen displayed in the apparatus to be controlled and a size of the area, in a case where the simulation step determines that the control is performed in the area.

3. A non-transitory computer-readable storage medium storing a program for executing the method according to claim 2.

* * * * *